United States Patent
He et al.

(10) Patent No.: US 12,425,892 B2
(45) Date of Patent: Sep. 23, 2025

(54) DYNAMICALLY MAPPING UNIFIED TRANSMISSION STATES FOR MULTIPOINT CONTROL CHANNEL RECEPTION

(71) Applicant: Apple Inc., Cupertino, CA (US)

(72) Inventors: Hong He, Cupertino, CA (US); Dawei Zhang, Saratoga, CA (US); Wei Zeng, San Diego, CA (US); Weidong Yang, San Diego, CA (US); Chunxuan Ye, San Diego, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 17/878,216

(22) Filed: Aug. 1, 2022

(65) Prior Publication Data
US 2024/0040409 A1   Feb. 1, 2024

(51) Int. Cl.
*H04W 24/08* (2009.01)
*H04W 72/1263* (2023.01)
*H04W 72/23* (2023.01)
*H04W 76/30* (2018.01)

(52) U.S. Cl.
CPC ....... *H04W 24/08* (2013.01); *H04W 72/1263* (2013.01); *H04W 72/23* (2023.01); *H04W 76/30* (2018.02)

(58) Field of Classification Search
None
See application file for complete search history.

(56) References Cited

U.S. PATENT DOCUMENTS

| | | |
|---|---|---|
| 2022/0116859 A1 | 4/2022 | Park |
| 2022/0225338 A1 | 7/2022 | Zhu |
| 2023/0224995 A1* | 7/2023 | Zhu ........................ H04L 5/0023 |

FOREIGN PATENT DOCUMENTS

| | | |
|---|---|---|
| WO | 2021217627 | 11/2021 |
| WO | 2022031546 | 2/2022 |
| WO | 2022052954 | 3/2022 |
| WO | 2022132631 | 6/2022 |
| WO | 20221558198 | 7/2022 |

OTHER PUBLICATIONS

International Search Report for PCT/US2023/028802; Nov. 21, 2023.
Samsung "On unified TCI framework for multi-TRP (MTRP) operation"; 3GPP TSG RAN WG1 #109-e R1-2203887; May 9, 2022.
International Search Report for PCT/CN2023/028800; Oct. 26, 2023.
International Search Report for PCT/CN2022/109354; Dec. 22, 2022.
Asustek "Enhancements on multiple TRP or panel transmission"; 3GPP TSG RAN WG1 #97 R1-1907443; May 17, 2019.

* cited by examiner

*Primary Examiner* — Robert M Morlan
(74) *Attorney, Agent, or Firm* — Kowert, Hood, Munyon, Rankin & Goetzel, P.C.

(57) ABSTRACT

This disclosure relates to techniques for performing multi-transmission and reception point operation in a wireless communication system. A transmission control indication state may be indicated for future monitoring of a control channel, e.g., using dynamic signaling. The indicated state may be used to provide and receive control information for performing multi-transmission and reception point operation.

16 Claims, 11 Drawing Sheets

```
ControlResourceSet ::=      SEQUENCE {
    controlResourceSetId        ControlResourceSetId,
    UnifiedTCIIndex-r18         INTEGER (0..1)      OPTIONAL,    -- Need S
```

*FIG. 8*

```
SearchSpace ::=             SEQUENCE {
    searchSpaceId               SearchSpaceId,
    controlResourceSetId        ControlResourceSetId    OPTIONAL,    -- Cond SetupOnly
    UnifiedTCIIndex-r18         INTEGER (0..1)          OPTIONAL,    -- Need S
```

| Serving Cell ID | | | | CORESET ID | | | Oct. 1 |
|---|---|---|---|---|---|---|---|
| CORESET ID | R | R | R | R | R | Unified TCI Index | Oct. 2 |

FIG. 11

| Serving Cell ID | | | | Search Space ID | | | Oct. 1 |
|---|---|---|---|---|---|---|---|
| Search Space ID | R | R | R | R | R | Unified TCI Index | Oct. 2 |

FIG. 12

| | | Unified TCI Index | | | Serving Cell ID | | | |
|---|---|---|---|---|---|---|---|---|
| Oct. 1 | C0 | C1 | | C4 | C5 | C6 | C7 | C8 | C9 |
| Oct. 2 | C2 | C3 | C4 | R | R | R | R | R | |
| Oct. 3 | C10 | C11 | R | R | R | R | R | | |

FIG. 13

| | | Unified TCI Index | | | Serving Cell ID | | | |
|---|---|---|---|---|---|---|---|---|
| Oct. 1 | C0 | C1 | | C4 | C5 | C6 | C7 | C8 | C9 |
| Oct. 2 | C2 | C3 | C4 | | | | | | C17 |
| Oct. 3 | C10 | C11 | C12 | | | | | | C25 |
| Oct. 4 | C18 | C19 | C20 | | | | | | C33 |
| Oct. 5 | C26 | | | | | | | | R |
| Oct. 6 | C34 | | | | | C39 | R | | |

DYNAMICALLY MAPPING UNIFIED TRANSMISSION STATES FOR MULTIPOINT CONTROL CHANNEL RECEPTION

FIELD

The present application relates to wireless communications, and more particularly to systems, apparatuses, and methods for communication using unified transmission control states for multi-transmission-reception-point operation in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for communication using unified transmission control states for multi-transmission-reception-point operation in a wireless communication system.

According to one set of embodiments, a method, at a cellular network may comprise establishing communication with a user equipment (UE) via a plurality of transmission and reception points (TRPs) and transmitting, to the UE, an indication of a plurality of transmission control indication (TCI) states activated for downlink communication from the plurality of TRPs. The method may further comprise selecting a first TCI state of the plurality of TCI states for transmission of a second downlink control information (DCI) message to the UE and transmitting, to the UE, a first DCI message comprising an indication of the first TCI state. The method may further comprise transmitting, to the UE using the first TCI state, the second DCI message, and exchanging data with the UE according to the second DCI message.

One set of embodiments may include a method, by a user equipment (UE). The method may include establishing communication with a cellular network via a plurality of transmission and reception points (TRPs) and receiving, from the cellular network, an indication of a plurality of transmission control indication (TCI) states activated for downlink communication from the plurality of TRPs. The method may further comprise receiving, from the cellular network, a first downlink control information (DCI) message comprising an indication of a first TCI state of the plurality of TCI states and selecting, based on the indication, the first TCI state for monitoring for further DCI. The method may further comprise monitoring for further DCI using the first TCI state and receiving, during said monitoring, a second DCI message. The method may further comprise receiving, from at least one TRP of the plurality of TRPs and using the first TCI state, the second DCI message; and exchanging data with the cellular network according to the second DCI message.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings.

FIGS. 6-19 illustrate exemplary aspects of various possible approaches to communication using unified transmission control states for multi-TRP operation in a wireless communication system, according to some embodiments.

Figure 1:
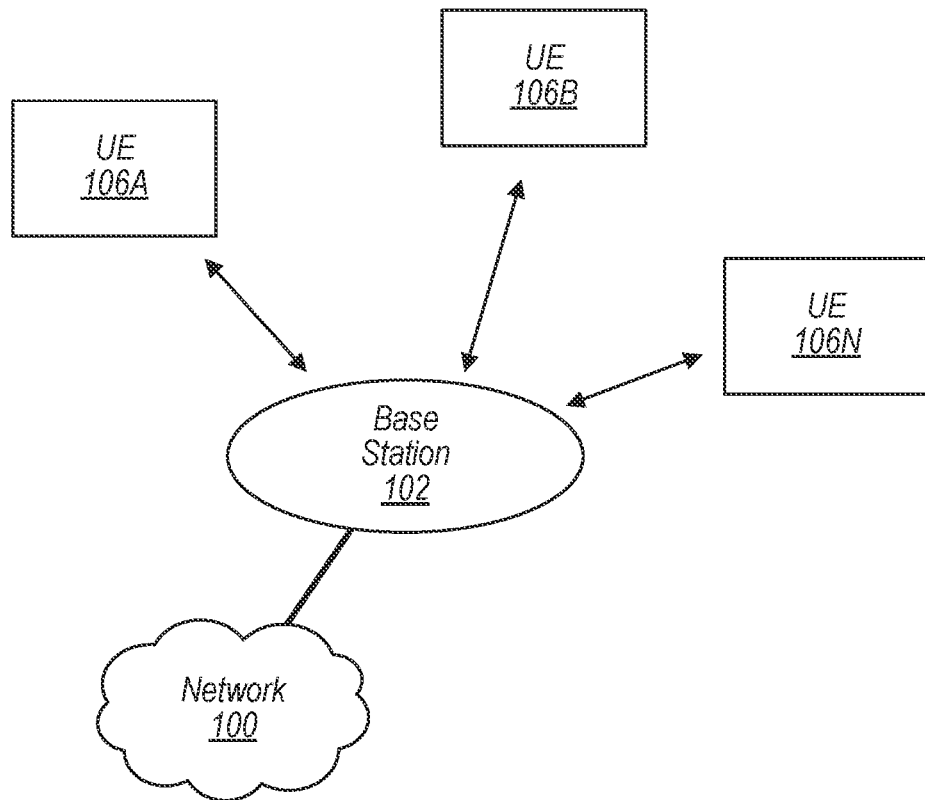
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
PDCCH: Physical Downlink Control Channel
TRP: Transmission-Reception-Point
TCI: Transmission Control Indicator
QCL: Quasi-co-located
DCI: Downlink Control Information
CSI: Channel State Information
CQI: Channel Quality Indicator

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
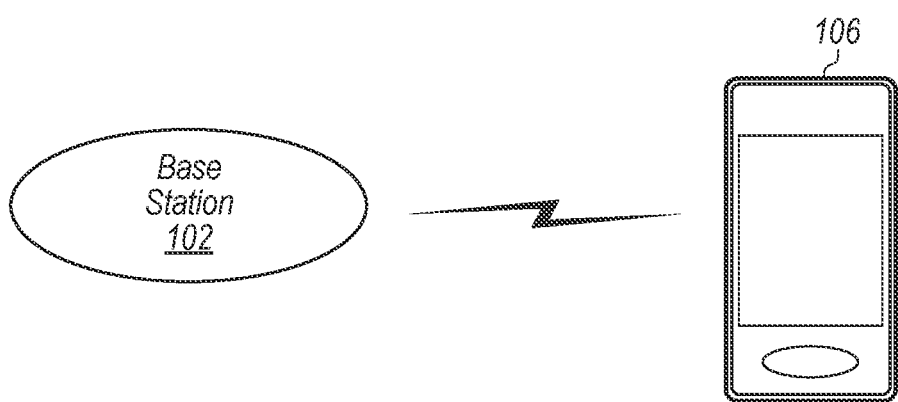
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for communication using unified TC states for multi-TRP operation in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

In some embodiments, the UE 106 may include multiple subscriber identity modules (SIMs, sometimes referred to as SIM cards). In other words, the UE 106 may be a multi-SIM (MUSIM) device, such as a dual-SIM device. Any of the various SIMs may be physical SIMs (e.g., SIM cards) or embedded (e.g., virtual) SIMs. Any combination of physical and/or virtual SIMs may be included. Each SIM may provide various services (e.g., packet switched and/or circuit switched services) to the user. In some embodiments, UE 106 may share common receive (Rx) and/or transmit (Tx) chains for multiple SIMs (e.g., UE 106 may have a dual SIM dual standby architecture). Other architectures are possible. For example, UE 106 may be a dual SIM dual active architecture, may include separate Tx and/or Rx chains for the various SIMs, may include more than two SIMs, etc.

The different identities (e.g., different SIMs) may have different identifiers, e.g., different UE identities (UE IDs). For example, an international mobile subscriber identity (IMSI) may be an identity associated with a SIM (e.g., in a MUSIM device each SIM may have its own IMSI). The IMSI may be unique. Similarly, each SIM may have its own unique international mobile equipment identity (IMEI). Thus, the IMSI and/or IMEI may be examples of possible UE IDs, however other identifiers may be used as UE ID.

The different identities may have the same or different relationships to various public land mobile networks (PLMNs). For example, a first identity may have a first home PLMN, while a second identity may have a different home PLMN. In such cases, one identity may be camped on a home network (e.g., on a cell provided by BS 102) while another identity may be roaming (e.g., while also camped on the same cell provided by BS 102, or a different cell provided by the same or different BS 102). In other circumstances, multiple identities may be concurrently home (e.g., on the same or different cells of the same or different networks) or may be concurrently roaming (e.g., on the same or different cells of the same or different networks). As will be appreciated, numerous combinations are possible. For example, two SIM subscriptions on a MUSIM device may belong to the same equivalent/carrier (e.g., AT&T/AT&T or CMCC/CMCC). As another exemplary possibility, SIM-A may be roaming into SIM-B's network (SIM-A CMCC user roaming into AT&T and SIM-B is also AT&T).

Figure 3:
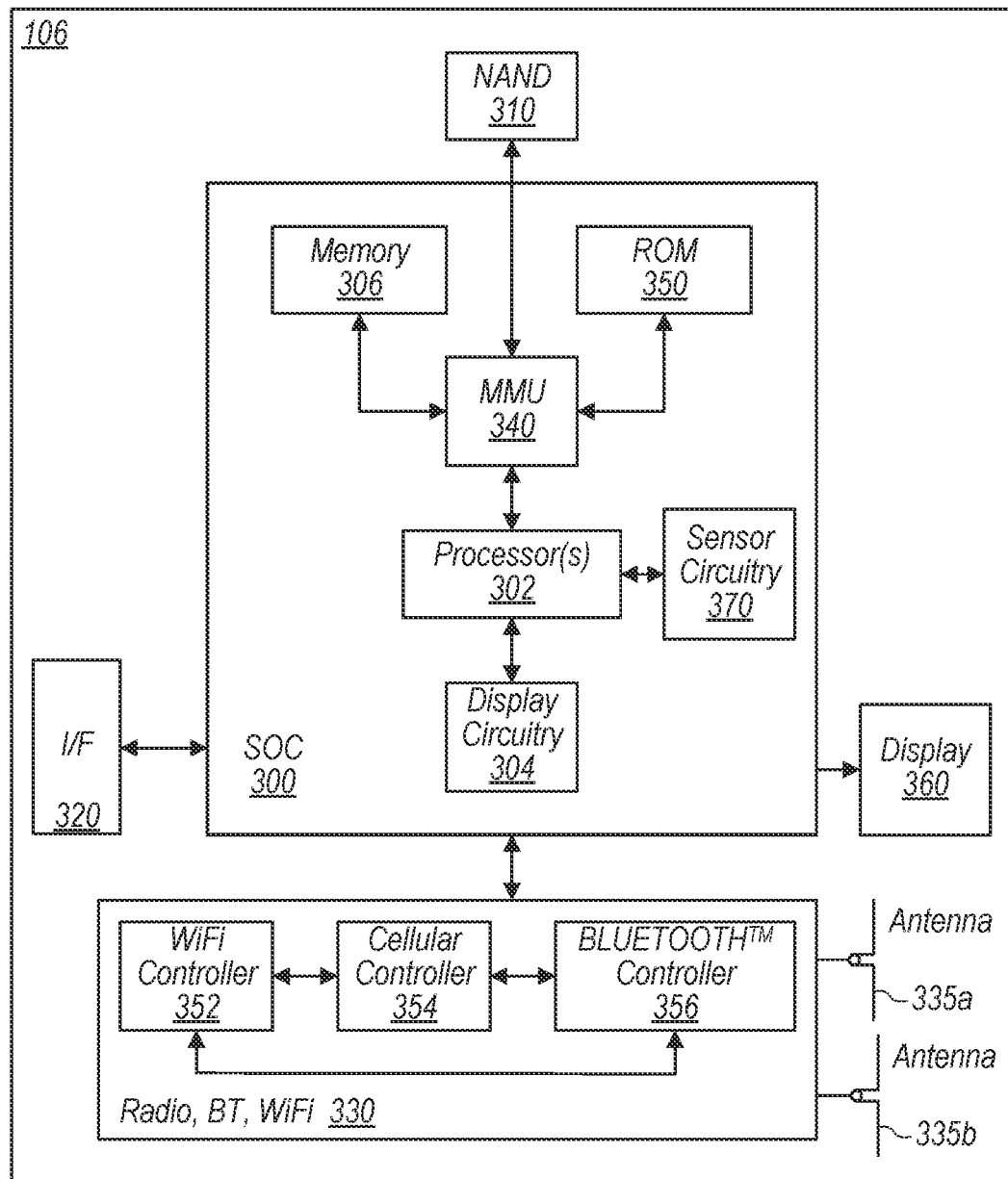
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for communication using unified TCI states for multi-TRP operation in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for communication using unified TCI states for multi-TRP operation in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
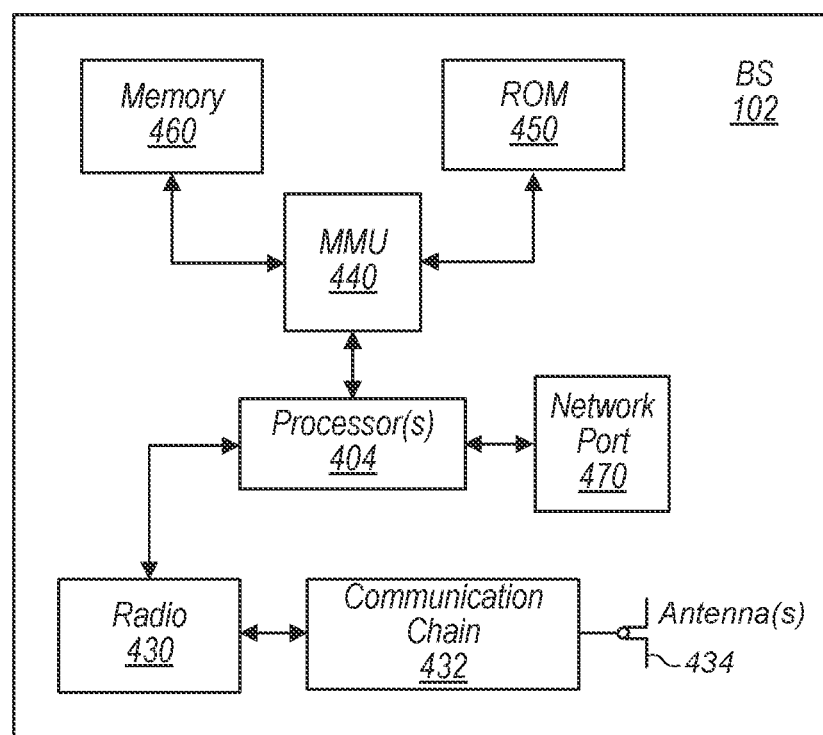
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g, for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
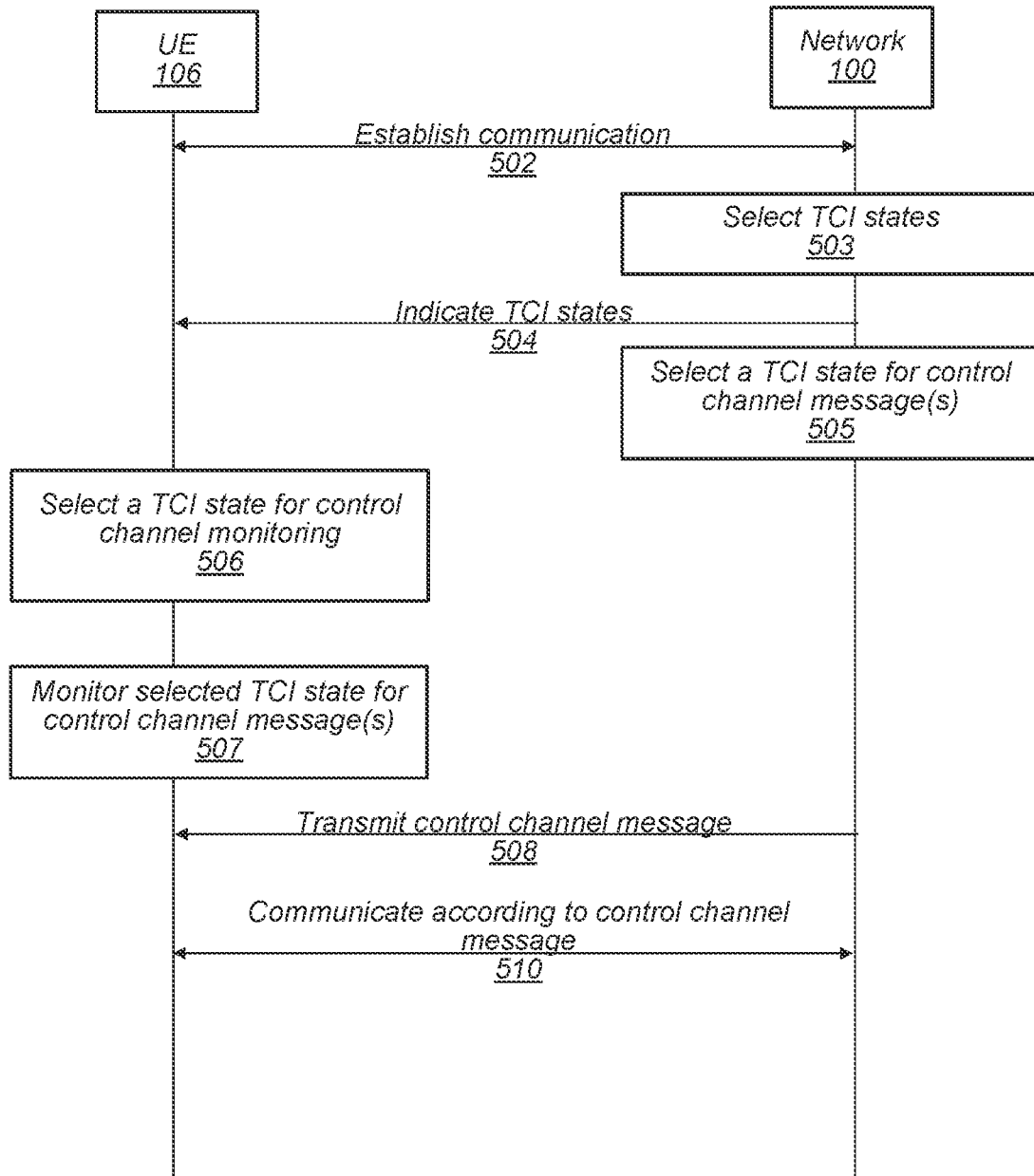
FIG. 5 is a communication flow diagram illustrating aspects of an exemplary possible method for communication using unified transmission control states for multi-TRP operation in a wireless communication system, according to some embodiments.

FIG. 5—Mapping TCI states for Multi-TRP Operation

According to some cellular communication technologies, it may be possible for a UE to communicate with multiple transmission-reception-points (TRPs), including potentially simultaneously. Such communication can be scheduled using downlink control information (DCI), which may be provided using control signaling such as on a physical downlink control channel (PDCCH) that may be transmitted in one or more control resource sets (CORESETs) and/or search space sets (SSSs). The DCI can be provided in a single DCI (sDCI) mode, in which communications between multiple TRPs (mTRP) and a wireless device/UE may be scheduled using a single DCI communication (e.g., from just one TRP), or in a multi-DCI mode, in which each of multiple TRPs can provide DCI communications scheduling their own communications with a wireless device.

The communications that are scheduled in such a multi-TRP scenario can include data communications (e.g., which may be transmitted using a physical downlink shared channel (PDSCH) and/or a physical uplink shared channel (PUSCH), and/or aperiodic channel state information reference signal (CSI-RS) transmissions, among various possibilities. Further, aperiodic CSI-RS transmissions can include CSI-RS that are configured for multiple possible purposes, such as for beam management, tracking, or CSI acquisition.

Transmission to/from a UE to a TRP may be directed according to a transmission control indication (TCI) state. For example, a TCI state may correspond to an uplink and/or downlink beam. A UE may be configured to use one or more TCI states simultaneously. A few years after the first deployment of NR, it is becoming clear that the TCI state framework in Rel-15 may be considered overly flexible, which may lead to a significant signaling overhead. A unified TC framework was introduced in Rel-17 which may facilitate streamlined multi-beam operation, e.g., for use with frequency range (FR) 2. According to the unified TCI framework, one TCI indication may apply to multiple channels (e.g., PDSCH, PUSCH, PDCCH, and PUCCH may all be mapped to a single common TCI state). Thus, a UE may always know to use the common TCI state to receive DCI, e.g., on PDCCH. As Rel-17 may focus on single-TRP (sTRP) use cases, extension of the unified TCI framework that focuses on multi-TRP use cases may be beneficial, e.g., for Rel-18. For example, one objective may be to enhance the unified TCI framework by extending it for multi-TRP (mTRP) use case, e.g., by specifying an extension of Rel-17 unified TCI framework for indication of multiple downlink (DL) and uplink (UL) TCI states focusing on multi-TRP use case.

In the case of mTRP operation with unified TCI State, a UE may be provided with up to two pairs of unified TCI States for two TRPs (e.g., or potentially more pairs for more TRPs). It will be appreciated that a TCI state may be DL only, UL only, or joint (e.g., useable for both DL and UL). In context of unified indication of TCI states, any TCI state may be associated with one or more channels. For example, some potential pairs may be as follows:

Unified TCI State Pair #1 may consist of <one DL TCI State X1, one UL TCI State X2> for TRP #1.
Unified TCI State Pair #2 may consist of <one DL TCI State Y1, one UL TCI State Y2> for TRP #2.

Note that these are examples and that other pairs may be used as desired. Further, it will be appreciated that some TRPs may be associated with only a single TCI state. In such a case, the TCI state may be joint, UL, or DL. Thus, some TRPs may be used for only one direction, e.g., under at least some circumstances.

One potential issue to be addressed for extending unified TCI framework to mTRP is how to associate the multiple unified TCI states (e.g., two DL TCI States) for control channel (e.g., PDCCH) monitoring and receptions. In other words, if a UE is configured with the two example TCI state pairs above, the UE may not have sufficient information to determine whether to use TCI state X1 or Y1 for receiving PDCCH (e.g., DCI). Moreover, as PDCCH/DCI may not be scheduled (e.g., by previous PDCCH/DCI), it may be beneficial for the UE to know which of the active TCI states (e.g., including multiple DL and/or joint TCI states) will be used (e.g., by the network) for providing the PDCCH/DCI.

Thus, it may be beneficial to specify techniques for selecting a TCI state for monitoring and reception of control channel (e.g., PDCCH and/or DCI) in a multi-TRP scenario, e.g., with multiple activated TCI states that may be used for downlink communication. In some cases, a single DCI (sDCI) may be used to provide control information for multiple TRPs (mTRP). To illustrate one such set of possible techniques, FIG. 5 is a flowchart diagram illustrating a method for performing TCI state mapping and selection for multi-TRP operation in a wireless communication system, at least according to some embodiments. Aspects of the method of FIG. 5 may allow the UE and network to each determine the same TCI state for the purpose of DCI and/or PDCCH, e.g., so that the UE may monitor and receive the control channel, DCI, and/or PDCCH without monitoring additional TCI states for control channel that will not be used by the network for that purpose. The method of FIG. 5 may be useful in sDCI mTRP scenarios, among various possibilities.

Aspects of the method of FIG. 5 may be implemented by a wireless device, e.g., in conjunction with one or more cellular base stations and/or TRPs, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular network (502), according to some embodiments. According to some embodiments, the wireless link may include a cellular link according to 5G NR. For example, the UE may establish a session with an AMF entity of the cellular network by way of one or more base stations (e.g., TRPs and/or gNBs) that provide radio access to the cellular network. As another possibility, the wireless link may include a cellular link according to LTE. Other types of cellular links are also possible, and the cellular network may also or alternatively operate according to another cellular communication technology (e.g., UMTS, CDMA2000, GSM, etc.), according to various embodiments.

Establishing the wireless link may include establishing a radio resource control (RRC) connection with a serving cellular base station, at least according to some embodiments. Establishing the RRC connection may include configuring various parameters for communication between the UE and the cellular base station, establishing context information for the UE, and/or any of various other possible features, e.g., relating to establishing an air interface for the UE to perform cellular communication with a cellular network associated with the cellular base station. After establishing the RRC connection, the UE may operate in a RRC connected state. In some instances, the RRC connection may also be released (e.g., after a certain period of inactivity with respect to data communication), in which case the UE may operate in a RRC idle state or a RRC inactive state. In some instances, the UE may perform handover (e.g., while in RRC connected mode) or cell re-selection (e.g., while in RRC idle or RRC inactive mode) to a new serving cell, e.g., due to UE mobility, changing wireless medium conditions, and/or for any of various other possible reasons.

At least according to some embodiments, the UE may establish multiple wireless links, e.g., with multiple TRPs of the cellular network, according to a multi-TRP configuration. In such a scenario, the UE may be configured (e.g., via RRC signaling) with one or more TCIs, e.g., which may correspond to various beams that can be used to communicate with the TRPs. Further, it may be the case that one or more configured TCI states may be activated (e.g., by RRC, media access control (MAC) control element (CE), and/or DCI signaling) for the UE at a particular time. For example, multiple TCI states may be activated.

The wireless links may be associated with corresponding control resource set(s) (CORESETs) and/or search space set(s) (SSSs), according to some embodiments. For example, a first TCI state may be associated with a first CORESET and/or SSS, among various possibilities.

At least in some instances, establishing the wireless link(s) may include the UE providing capability information for the UE. Such capability information may include information relating to any of a variety of types of UE capabilities.

At least in some instances, establishing the wireless link(s) may include the UE exchanging configuration information with the network. Among various possibilities, the configuration information may include information related to selection of a TCI state (from a plurality of active TCI states) for the UE to use to monitor/receive control channel (e.g., PDCCH and/or DCI). For example, the network may provide one or more rules for the UE to use to select such a TCI state. In some embodiments, such a rule or rules may be pre-configured at the UE and at the network (e.g., included in a wireless standard that the UE implements), and thus may not be indicated as part of establishing the link(s).

As another possibility, the configuration information may include an indication of one or more CORESETs and/or SSSs for the UE. For example, the UE may be configured to use any number of CORESETs and/or any number of SSSs. It will be appreciated that the various CORESETs and/or SSSs may be configured differently. For example, different CORESETs and/or SSSs may be associated with different rules for selecting a TCI state for monitoring control channel. Similarly, different CORESETs and/or SSSs may be configured to use different approaches (e.g., of the various approaches discussed further below) for selecting a TCI state for monitoring control channel (e.g., PDCCH).

As another possibility, the configuration information may include an indication of a division of a plurality of SSSs and/or CORESETs into two or more pools. For example, the network may indicate that one group of SSSs will be considered a first pool and a second group of SSSs may be considered a second pool. Similarly, the network may indicate that one group of CORESETs will be considered a first pool and a second group of CORESETs may be considered a second pool. In other words, multiple SSSs (or CORESETs) may be grouped/divided into multiple pools of SSSs (or CORESETs).

The configuration information may be exchanged via RRC, among various possibilities.

The network may select (e.g., activate) a plurality of TCI states for the UE (503), according to some embodiments. For example, the TCI states may be selected based on the current location of the UE, motion of the UE, channel conditions, and/or other factors. In some cases, the group of TCI states may include two or more unified TCI state pairs, e.g., corresponding to one, two or even more TRPs. Notably, the plurality of active TCI states may, in at least some cases, include more than one TCI state that may be used for DL communication. In other words, two or more active TCI states may be DL only and/or joint DL and UL.

The network may indicate the plurality of active TCI states to the UE (504), according to some embodiments. For example, the network may transmit an (e.g., unified) indication (or indications) of a group of TCI states to the UE.

The network may indicate the plurality of active TCI states to the UE using any type (or combination of types) of signaling. For example, the network may use RRC, MAC, and/or DCI signaling/messages to activate the TCI states. The indication may be transmitted as a single message or a combination of multiple messages.

The UE may receive the indication(s) of the active TCI states. The UE may or may not respond to, acknowledge, or otherwise transmit information to the network about the activation. As one possibility, the UE may transmit one or more suggested TCI states and/or information about TCI states.

Figure 6:
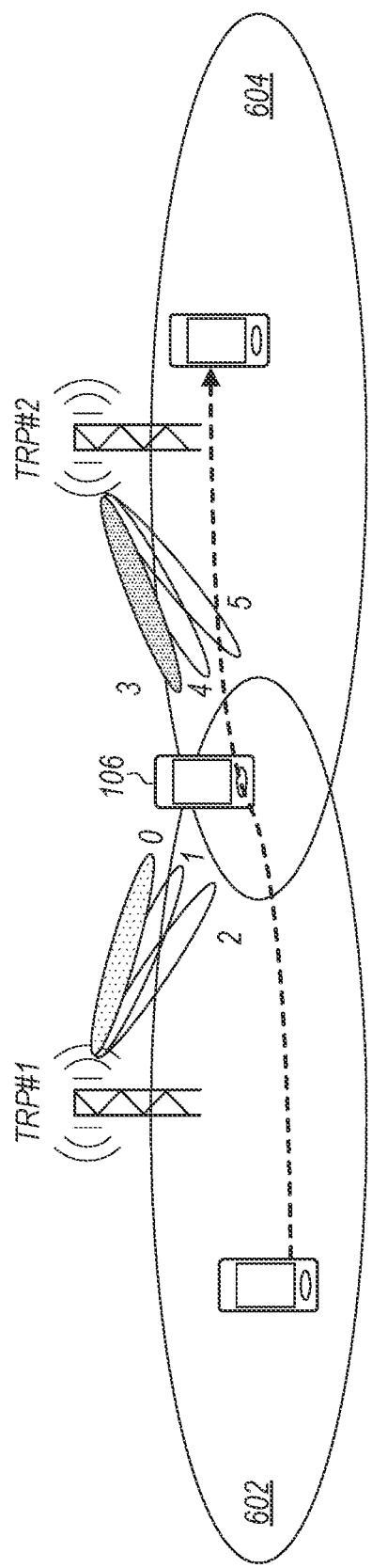

FIG. 6 illustrates an example, in which UE 106 is configured with TCI state 0 from TRP #1 and TCI state 3 from TRP #2, according to some embodiments. Each of these TCI states may be useable for DL communication. As the UE 106 moves from the coverage area 602 of TRP #1 to the coverage area 604 of TRP #2, the active TCI state(s) may be updated. For example, when UE 106 moves completely into 604 (and no longer is in 602), the TCI state(s) associated with TRP #1 may be deactivated and one or more TCI states associated with TRP #2 (e.g., which may be different than TCI state 3) may be activated.

The network may select a TCI state for transmission of control channel messages to the UE (505), according to some embodiments. The selected TCI state may be one of the plurality of active states. The selected TCI state may be a DL or joint TCI state.

The UE may select a TCI state to use for monitoring and reception of a control channel (506), according to some embodiments. For example, the UE may select a single TCI state (e.g., of the plurality of active TCI states indicated in 504, which may include multiple DL and/or joint TCI states) to monitor for PDCCH and/or DCI.

In some embodiments, the UE may select different TCI states (e.g., of the plurality of active TCI states indicated in 504) to monitor for control channel associated with different CORESETs and/or SSSs.

A variety of approaches may be used for selecting the TCI state for control channel, as further explained below. These approaches may include use of one of more rules, semi-static configuration, and/or dynamic signaling, among various possibilities.

One approach may be to use implicit mapping, e.g., based on one or more rule encoded in a specification such as a wireless standard. As one example of such a rule, the DL or joint TCI state with a smallest identifier (ID) (e.g., a TCI state ID) within the plurality of active TCI states may be selected for control channel monitoring and reception. More generally, such a rule may be based on a ranking or other characteristic(s) of the TCI state IDs of the DL or joint TCI states. For example, a rule may be configured such that the highest ID or median ID may be selected, among various possibilities.

As another possible rule, within the plurality of active TCI states, the DL or joint TCI state with quasi-colocated (QCL) source RS on a serving cell may be selected for control channel monitoring and reception. In other words, the rule may be to select a DL or joint TCI state associated with a serving cell, if such a TCI state is available. If the QCL source RS of multiple activated DL or joint TCI states are on the serving cell or if no activated DL or joint TCI state have source RS with QCL on the non-serving cell, a TCI state may be selected based on ranking of TCI state IDs (e.g., a TCI state with a smallest ID may be selected).

Figure 7:
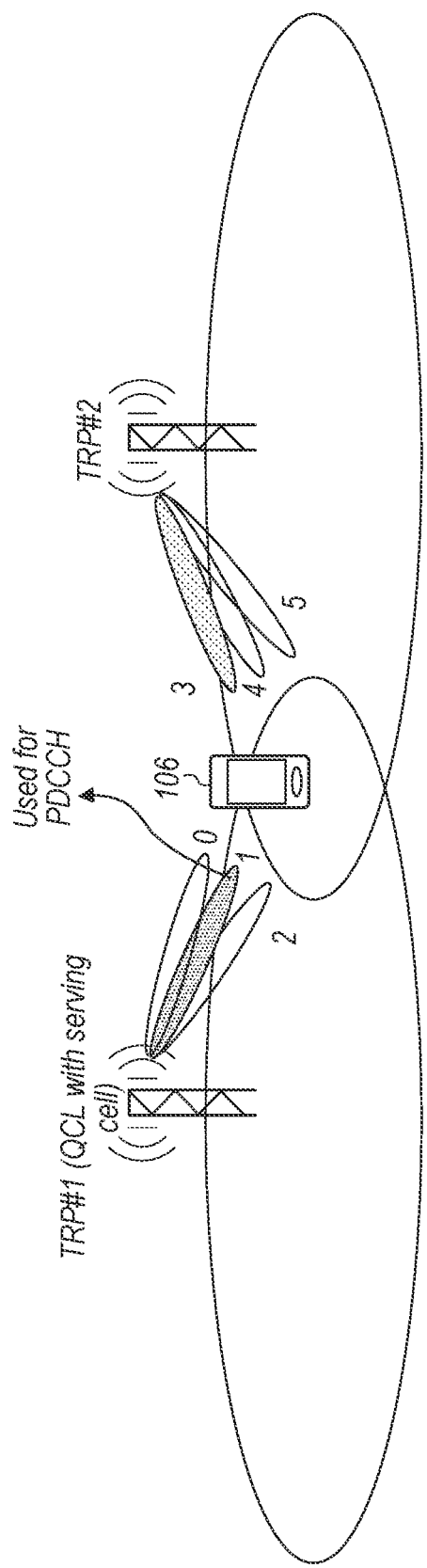

FIG. 7 provides one example of implicit TCI state determination/selection for control channel monitoring and reception, according to some embodiments. Referring to FIG. 7, TCI states #1 and #3 may be activated for DL or joint communication. Correspondingly, the TCI State #1 with QCL source RS on a serving cell may be selected for control channel monitoring and reception (e.g., according to a rule to select a TCI state associated with the serving cell), according to some embodiments. As another possibility, TCI state #1 may be selected based on a rule to select a DL or joint TCI state with a lowest ID (e.g., note that in this example, TCI state #0 may not be activated (e.g., at all, or for DL use)).

Another approach may be an explicit indication of one of the plurality of activated TCI states, according to some embodiments. For example, such an explicit indication may be an RRC-based association of an activated TCI state for control channel monitoring and reception in sDCI mTRP use case. However, it will be appreciated that other types of signaling (e.g., instead of or in addition to RRC) may be used as desired. Examples using RRC, MAC, and/or DCI signaling are discussed below.

Further, it will be appreciated that such an explicit indication may be transmitted by the network and received by the UE at any time. For example, such an explicit indication may be transmitted during 502 (e.g., in association with establishing, updating, or reconfiguring a wireless link), during 504 (e.g., in association with activating TCI states or changing which TCI states are active), and/or at any other time (e.g., such an explicit indication may be replaced, refreshed, or updated periodically or as needed). Thus, the UE may receive such an explicit indication and may select a (e.g., potentially new/changed) TCI state (or states) for control channel monitoring and reception in response to receiving the indication. In some embodiments, the indication may be transmitted with an indication of when or under what condition the TCI state should be updated. For example, the indication may be provided a certain amount of time in advance of when the TCI state should be updated (e.g., when the UE and network should start to apply the TCI state).

As one example, for a CORESET associated with a unified TCI State, a UE may be explicitly configured (e.g., by RRC or other higher layer) to associate one of the active TCI states with PDCCH/DCI reception. FIG. 8 illustrates an example information element (IE) as may be used to indicate one TCI state of a plurality of active TCI states, according to some embodiments. As shown, a CORESET may be identified by its ID and a unified TCI index (e.g., UnifiedTCIIndex-R18) field may be used to indicate the TCI state to be used for control channel monitoring and reception. The unified TCI index field may indicate the index of the unified TCI state for this CORESET, e.g., as specified in TS 38.213 (e.g., clauses 9 and 10) and TS 38.214 (e.g., clauses 5.1 and 6.1). Thus, the unified TCI index field may use an index of the active DL or joint TCI states to indicate which one of the active states is used for control channel monitoring and reception. In the event that the unified TCI index field is missing, the UE may apply a default value (e.g., 0). In the case that there are two active DL or joint TCI states, the unified TCI index may be 0 or 1 (e.g., as shown in FIG. 8). However, in the case that there are more than two active DL or joint TCI states, the unified TCI index may be more than 1 bit and may have a larger maximum value.

As another example, for a SSS that is associated with a CORESET associated with a unified TCI State, a UE may be explicitly configured (e.g., by RRC or other higher layer) to associate one of the active TCI states with control channel monitoring and reception. FIG. 9 illustrates an example IE as may be used to indicate one TCI state of a plurality of active TCI states, according to some embodiments. As shown, a SSS may be identified by its ID and a unified TCI index field may be used to indicate the TCI state to be used for control channel monitoring and reception. Optionally, a CORESET may also be identified. Similar to the previous example, the unified TCI index field may indicate the index of the unified TCI state for this SSS, e.g., as specified in TS 38.213 (e.g., clauses 9 and 10) and TS 38.214 (e.g., clauses 5.1 and 6.1). Thus, the unified TCI index field may use an index of the active DL or joint TCI states to indicate which one of the active states is used for PDCCH. In the event that the unified TCI index field is missing, the UE may apply a default value (e.g., 0). In the case that there are two active DL or joint TCI states, the unified TCI index may be 0 or 1 (e.g., as shown in FIG. 9). However, in the case that there are more than two active DL or joint TCI states, the unified TCI index may have a larger maximum value. In some embodiments, for Types 0, 1, or 2 SSS, the CSI-RS associated with the Rel-17 indicated TCI may be QCL with an SSB associated with the serving cell physical cell ID (PCI) that may be used to indicate the physical layer identity of the serving cell.

Thus, FIGS. 8 and 9 provide some examples of abstract syntax notation one (ASN.1) code to implement these two options of higher layer (e.g., RRC) signaling for an explicit indication. As shown, a new IE 'UnifiedTCIIndex-r18' may be added into the CORESET configuration or SSS configuration to explicitly configure the TCI state for PDCCH from the activated unified DL and/or joint TCI state. The activated TCI states may be indexed in order of their IDs. Thus, a value of '0' may correspond to the smallest TCI state ID and a value of '1' corresponds to the next larger TCI state ID, etc.

As noted above, in another example, semi-static signaling may be used to explicitly indicate a TCI state (e.g., of a plurality of active DL or joint TCI states) for control channel monitoring and reception. For example, media access control (MAC) control element (MAC-CE) based association may be used for control channel monitoring and reception, e.g., in an sDCI mTRP use case. A new MAC-CE may be used to indicate a TCI state for control channel monitoring and reception. The MAC-CE may be identified by a MAC subheader with a dedicated logical channel ID (LCID). The LCID may be encoded in a specification (e.g., a 3GPP standard).

In some embodiments, a CORESET-dedicated or SSS-dedicated MAC-CE may be used to indicate the TCI to the UE. This (e.g., new) MAC-CE may have a fixed size of two octets (e.g., 16 bits) and may include some or all of the following fields:

Serving Cell ID: This field may indicate the identity of the serving cell for which the MAC-CE applies.

CORESET ID: This field may indicate a CORESET for which the TCI state is indicated.

SSS ID: This field may indicate an SSS for which the TCI state is being indicated.

Unified TCI Index: indicates the index of an activated TCI state for use for monitoring PDCCH/DCI according to this MAC-CE. The unified TCI index field may be configured as discussed above with respect to FIGS. 8 and 9.

FIGS. 10 and 11 depict example MAC-CE structures of the (e.g., new) MAC-CE that may be used to indicate the TCI state for control channel monitoring and reception, according to some embodiments. Using these MAC-CE, the network may indicate a TCI state for a CORESET (e.g., using FIG. 10) or for a SSS (e.g., using FIG. 11). These MAC-CE may include a serving cell ID, ID of the CORESET or SSS, a number of reserved bits (R, in the figures), and the unified TCI index. It will be appreciated that alternative designs of the MAC-CE may be used as desired.

Thus, a UE may select the indicated TCI state (e.g., for the CORESET or SSS) for use for control channel monitoring and reception. It will be appreciated that such an indication may be treated in a semi-static manner, e.g., to remain in effect until changed. Further, the network may indicate different TCI states for any number of different CORESETs and/or SSSs by transmitting corresponding MAC-CEs for each CORESET or SSS, according to some embodiments.

Further, MAC signaling may be used to explicitly indicate a TCI state for control channel monitoring and reception for more than one CORESET or more than one SSS. For example, a CORESET-common or SSS-common MAC-CE may be used to indicate TCI state association for control channel monitoring and reception. In this case, the (e.g., new) MAC-CE may have a fixed size of three octets (e.g., 24 bits) for COREST-common MAC-CE and a fixed size of six octets (e.g., 48 bits) for SSS-common MAC-CE, according to some embodiments.

Such a MAC-CE may include fields as depicted in FIG. 12 or 13, according to some embodiments. The serving cell ID and unified TCI index fields may be as described above with respect to other examples. The fields C0, C1, C2, etc. may indicate the CORESETs or SSSs for which the indicated TCI (e.g., by the unified TCI index field) should be applied. In other words, the MAC-CE may include a bitmap of any number of SSSs or CORESETs. The bitmap may indicate which of the SSSs or CORESETs use the indicated TC state for control channel monitoring and reception. For example, the value of '1' may be set to indicate to apply the TCI state for the corresponding CORESET or SSS and the value of '0' may indicate that the TCI state is not to be applied for the corresponding CORESET or SSS. The '0' value may indicate that the UE should continue using a previously set TCI state. Thus, the bitmap may indicate which SSSs or CORESETs may be updated. Alternatively, a value '0' may indicate that the UE should use a default TCI state. FIG. 12 may indicate the MAC-CE structure in a CORESET based implementation, according to some embodiments. FIG. 13 may indicate the MAC-CE structure in a SSS based implementation, according to some embodiments.

Thus, a UE may select the indicated TCI state (e.g., for the CORESETs or SSSs) for use for control channel monitoring and reception. It will be appreciated that such an indication may be treated in a semi-static manner, e.g., to remain in effect until changed. Further, the network may indicate different TCI states for any number of different CORESETs and/or SSSs by transmitting corresponding MAC-CEs for different TCI states and using the bitmaps to indicate which CORESETs or SSSs for the different TCI states, according to some embodiments.

In some embodiments, a MAC-CE that indicates multiple TCI states (e.g., using multiple TCI index fields) may include multiple bitmaps (e.g., associated with the different TCI index fields). Such a MAC-CE may allow for indications of different TCI states for different groups of CORESETs or SSSs in a single MAC-CE.

Figure 14:
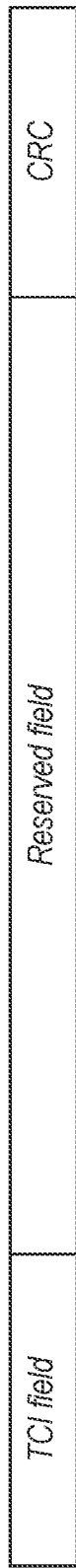
Figure 15:
Figure 16:

As another example, dynamic signaling such as DCI may be used to signal which TCI state should be used for control channel monitoring and reception, according to some embodiments. As one possibility, a DCI format may be modified for this purpose. For example, the Rel-17 DCI format 1_1 or 1_2 that includes a unified TCI state indication (and does not schedule data) is shown in FIG. 14, according to some embodiments. This DCI format may be modified to signal which TCI state should be used for control channel monitoring and reception by repurposing some of the reserved fields as "CORESET indication" or 'SSS indication" fields as shown in FIG. 15 and FIG. 16, respectively. These DCI messages may be used to associate the TCI state (e.g., for control channel monitoring and reception) for each CORESET or each search space set, respectively.

The TCI field may identify one or more TCI states, e.g., by the corresponding TCI state index (indices) or TCI state ID. For example, the TCI field may indicate a pair of TCI states.

The CORESET indication field may be fixed to be 12 bits or variable size depending on the number of CORESET configured (e.g., by RRC signaling in 502), according to some embodiments. The SSS indication field may be fixed to be 40 bits or variable size depending on the number of SSSs configured (e.g., by RRC signaling in 502), according to some embodiments. Note that different fixed sizes (e.g., other than 12 or 40 bits) may be used as desired. Both the CORESET indication and SSS indication field may be a form of bitmap signaling. Thus, each bit in the bitmap may correspond to a CORESET or SSS. The bitmap values may be interpreted according to any of various rules.

According to a one possible rule, a value of '1' may indicate that the corresponding CORESET or SSS is associated with the smallest TCI state index of the TCI states indicated by the TCI field. The value '0' may indicate the highest TCI state index. It will be appreciated that the values may be reversed as desired.

According to another possible rule, a value of '1' may indicate that the corresponding CORESET or SSS is updated to be associated with the (e.g., single/only) TCI state indicated by the TCI field. The value '0' may indicate that it is not updated. Alternatively, a value '0' may indicate that the UE should use a default TCI state. It will be appreciated that the values may be reversed as desired.

Other rules may be used as desired. For example, rules discussed above with respect to implicit mapping may be used in association with DCI signaling.

Figure 17:
Figure 18:
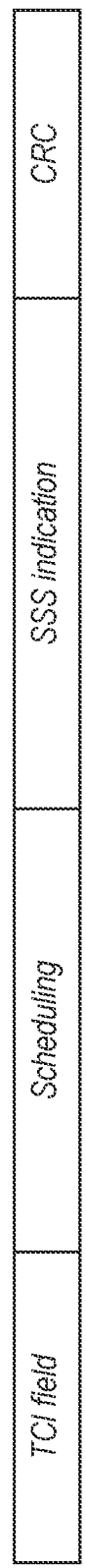

As another possibility, the Rel-17 DCI format 1_1 or 1_2 that includes a unified TCI state indication (and does schedule data) may be modified to signal which TCI state should be used for control channel monitoring and reception by adding the "CORESET indication" or 'SSS indication" fields as shown in FIG. 17 and FIG. 18, respectively. The TCI, CORESET, and SSS fields may be interpreted as discussed above with respect to the examples of DCI that do not schedule data.

Figure 19:
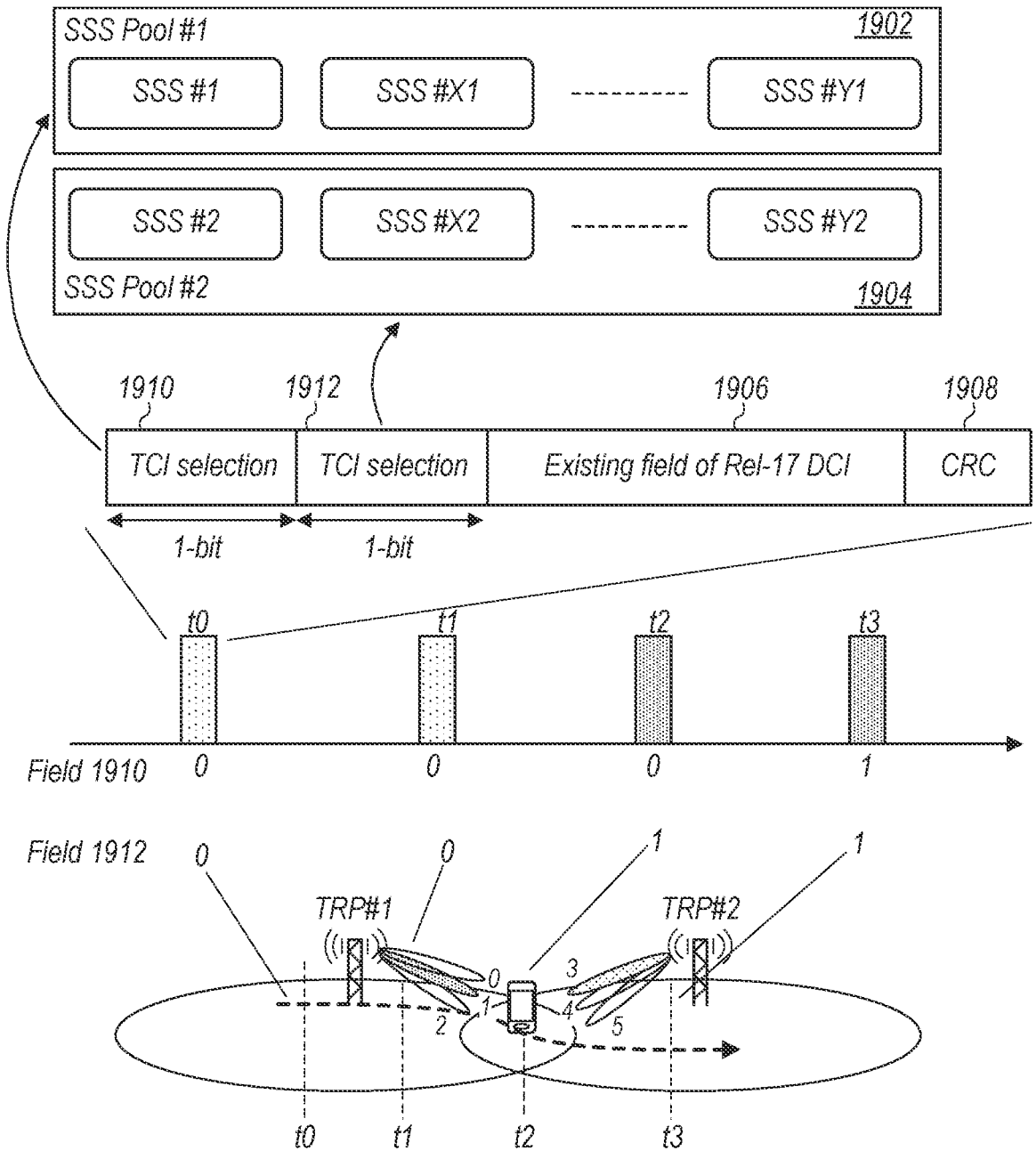

As a further possibility, a two-step signaling approach may be used, according to some embodiments. FIG. 19 illustrates an example of the two-step signaling, according to some embodiments. As noted above, a group of CORESETs or SSSs may be first divided into two or more pools by configuration information (e.g., RRC signaling, etc. during 502). For example, they may be divided into pool #1 (1902) of CORESETs or SSSs and pool #2 (1904) of CORESETs or SSSs.

Then, during 506, TCI selection fields (1910, 1912) maybe transmitted in DCI to indicate which TCI state should be applied (e.g., for control channel monitoring) for the different pools. As shown, field 1910 may apply to pool #1 and field 1912 may apply to pool #2. For example, such fields may be added to DCI format 1_1 and/or 1_2 (e.g., in addition to CRC 1908 and other existing fields of the DCI according to Rel. 17 1906). A TCI selection field may be 1 bit, among various possibilities. A first TCI selection field may be applied for the first CORESET or SSS pool, a second TCI selection field may be applied for the second CORESET or SSS pool. The TCI selection fields may use any of various rules to indicate which of the configured DL or joint TCI states (e.g., as indicated in 504) may be applied to the corresponding pool. For example, any of the rules discussed elsewhere herein may be applied, as desired.

As one possibility, a value of '0' in a TCI selection field may indicate to apply the TCI state with a smallest ID to the corresponding pool and a value of '1' may indicate to apply the TCI state with a largest ID for the corresponding pool.

As another possibility, a value of '0' in a TCI selection field may indicate to apply a default TCI state or not to update the current TCI state for the corresponding pool and a value of '1' may indicate to update the TCI state for the corresponding pool. A particular TCI state may be indicated (e.g., directly by ID or indirectly according to some rule) for the update elsewhere in the same DCI message (e.g., in a TCI state field (not shown)) or in a different message.

As another possibility, the TCI selection field may indicate an index of a TCI state within the set of active DL or joint TCI states, e.g., indicating that the TC state with that index should be selected for the pool corresponding to the TCI selection field.

In some embodiments, the indicated TCI state(s) may be (e.g., by default) may be applied as soon as possible. For example, the UE and network may apply the indicate state(s) at a next control channel opportunity (e.g., for an active CORESET and/or SSS). Thus, if a DCI as illustrated in FIG. 19 is transmitted during a first window of PDCCH, the indicated state(s) may be used to transmit/receive/monitor PDCCH at a next subsequent window of PDCCH.

In some embodiments, the DCI may include a further field to indicate a delay for applying the indicated TCI state(s).

FIG. 19 further illustrates how the second step of this two-step signaling may be applied to a UE moving between the coverage areas of two TRPs over times t0 to t3, according to some embodiments. In FIG. 19, two DL TCI states, (e.g., TCI #1 and TCI #3) may have been activated by network before time instance 't0'. At each of times t0, t1, t2, and t3, the network may transmit a DCI to the UE and each DCI may include two TCI selection fields 1910 and 1912. Referring to FIG. 19, the shaded bars may represent DCI messages transmitted to the UE at the indicated time instances. The DCI messages may use different DCI formats. The value of the TCI selection fields 1910 and 1912 in the different DCIs may change as shown in the table.

In FIG. 19, it may be assumed that the value '0' of a TCI selection field indicates to apply the TCI state with a smallest ID to the corresponding pool and the value '1' of a TCI selection field indicates to apply the TCI state with a largest ID to the corresponding pool. Referring to FIG. 19, according to the TC selection fields in the DCIs received in time instance 't0' and 't1', the UE may select the activated TCI with the smallest ID (e.g., TCI #1 is the smallest of TCI #1 and #3) for both CORESET pool or SSS pool and therefore may operate in a sDCI sTRP mode at times t0 and t1 with TRP #1. At time t2, e.g., upon the UE moving to the boundary of two TRPs, the network may trigger the UE to monitor SSS pool #1 from TRP #1 and SSS pool #2 from TRP #2 such that seamless handover is achieved. To achieve this multiple TRPs communication, as depicted in FIG. 19, the network may set the TCI selection field 1910 with a value of '0' and TCI selection field 1912 with a value of '1' in DCI transmitted in time instance t2'. As one consequence, after detecting the DCI in time instance 't2', the UE may use TCI state with the smallest ID (e.g., TCI #1) for the SSS pool 1902 and use the TCI state with the largest ID (e.g., TCI #3) for the SSS pool 1904 to monitor PDCCH. Similarly, at time instance 't3', the network may transmit a DCI with both TCI selection field 1910 and 1912 to be '1' and therefore the TC state with the largest ID (e.g., TCI #3) may be applied for both SSS pools. Consequently, the UE may operate in a sDCI sTRP mode starting from time t3 with TRP #2.

Thus, between each of the times (e.g., between t0 and t1, between t1 and t2, etc.), the UE may select the indicated TCI state for each pool (e.g., according to 1910 for pool #1, according to 1912 for pool #2) for monitoring control channel. For example, between times t2 and t3, the UE may select TCI state 1 to monitor for control channel of SSS Pool #1 1902 based on the value '0' of field 1910 and additionally select TCI state 3 to monitor for control channel of SSS Pool #2 based on the value '1' of field 1912 in the DCI received at time t2.

It will be appreciated that although FIG. 19 depicts an example with 2 SSS pools and 2 corresponding TCI selection fields, any number of SSS or CORESET pools (and correspondingly, an equal number of TCI selection fields) may be used as desired. Further, in the example of FIG. 19, the TCI selection fields may be illustrated as 1-bit each. However, longer TCI selection fields may be used as desired.

As shown in FIG. 19, one DCI may be used to update the TCI state that the UE may monitor for subsequent DCI.

The UE may monitor the selected TCI state for control channel transmissions from the network (507), according to some embodiments. For example, the UE may tune receive circuitry according to the selected TCI state for control channel reception at times/frequencies associated with PDCCH, e.g., for an active SSS and/or CORESET. Thus, the UE may be ready to receive DCI and/or other control channel messages according to the selected TC state.

The network may transmit control channel information to the UE according to the selected TCI state (508), according to some embodiments. It will be appreciated that the network may also determine (e.g., according to the various rules and methods discussed with respect to 506) what TCI state the UE may monitor for control channel transmissions. Thus, the network may use the selected TCI state for transmission of the control channel. For example, the network may transmit one or more DCI messages to the UE on PDCCH using the selected TCI state.

The UE and the network may communicate according to the control channel (510), according to some embodiments. For example, the control channel may include a DCI scheduling uplink and/or downlink data. The DCI may indicate a TCI state (or multiple states) for the data. The TCI state(s) for the data may be the same or different than the selected TCI state (e.g., for control channel monitoring). Thus, the UE and network may exchange the data using the TCI state(s) indicated for the data according to the channel.

However, the UE may continue to monitor the selected TCI state for further control channel transmissions, according to some embodiments. For example, the UE may periodically tune to the selected TCI state (e.g., at time/frequency locations associated with control channel for a relevant SSS and/or CORESET)

Thus, at least according to some embodiments, the method of FIG. 5 may be used to provide a framework according to which a UE and network may select a TCI state (e.g., of multiple active TCI states which may be associated with multiple TRPs) for control channel monitoring and reception, and thus to assist the network to effectively and efficiently schedule and perform wireless communications with the UE, at least in some instances.

As noted above, the order shown in FIG. 5 is only one example. For instance, it will be appreciated that 502-506 may occur in any order and/or at the same or overlapping times. For example, 505 may occur at the same time as 503; then an indication of the plurality of states (e.g., 504) may occur along with an indication of any rule or further signaling (e.g., MAC-CE, DCI, etc.) as discussed further below with respect to 506. In such a case, 503-505 may occur as part of 502 or at any later time(s).

Similarly, any of these steps may be repeated any number of times (e.g., as a UE moves, etc.). Any or all of 502-504 may not be repeated as often as 505-510, according to some embodiments. In other words, the plurality of active TCI states may be updated (e.g., 503, 504) less frequently than the TCI state for control channel monitoring (e.g., 505-507), according to some embodiments.

In the following further exemplary embodiments are provided.

One set of embodiments may include a method, by a user equipment (UE). The method may include establishing communication with a cellular network via a plurality of transmission and reception points (TRPs); receiving, from the cellular network, an indication of a plurality of transmission control indication (TCI) states for downlink communication from the plurality of TRPs; selecting, according to a first rule, a TCI state of the plurality of TCI states for monitoring of control channel messages from the cellular network via the plurality of TRPs; monitoring for the control channel messages using the selected TCI state; receiving, from the cellular network via at least one TRP of the plurality of TRPs, a first control channel message using the selected TCI state; and exchanging data, with the cellular network, according to the first control channel message.

In some embodiments, the method may further comprise determining respective TCI identifiers for respective TCI states of the plurality of TCI states.

In some embodiments, the first rule comprises: selecting the TCI state with a lowest TCI identifier.

In some embodiments, the method may further comprise determining whether respective TCI states of the plurality of TCI states are associated with a serving cell.

In some embodiments, the first rule comprises; in response to determining that exactly one TCI state of the plurality of TCI states is associated with the serving cell, selecting the exactly one TCI state that is associated with the serving cell as the selected TCI state.

In some embodiments, the first rule comprises: in response to determining that no TCI state of the plurality of TCI states is associated with the serving cell, selecting the TCI state of the plurality of TCI states with a lowest TCI identifier.

In some embodiments, the first rule comprises: in response to determining that multiple TCI states of the plurality of TCI states are associated with the serving cell, selecting the TCI state with a lowest TCI identifier of the multiple TCI states associated with the serving cell.

One set of embodiments may include a method, by a user equipment (UE). The method may include establishing communication with a cellular network via a plurality of transmission and reception points (TRPs); receiving, from the cellular network, an indication of a rule for selecting a transmission control indication (TCI) state from a generic plurality of TCI states for downlink communication from the plurality of TRPs; receiving, from the cellular network, an indication of an activated plurality of unified TCI states for downlink communication from the plurality of TRPs; selecting, based on the rule, a TCI state for control channel monitoring from the activated plurality of TCI states; monitoring a control channel using the selected TCI state; receiving, from at least one TRP of the plurality of TRPs and using the selected TCI state, a control channel message; and exchanging data with the cellular network according to the control channel message.

In some embodiments, the indication of the rule is received via radio resource control (RRC) signaling.

In some embodiments, the RRC signaling includes a unified TCI index field.

In some embodiments, a first possible value of the unified TCI index field indicates that the rule is to select the TCI state with a highest TCI index of the activated plurality of TCI states.

In some embodiments, a second possible value of the unified TCI index field indicates that the rule is to select the TCI state with a lowest TCI index of the activated plurality of TCI states.

In some embodiments, wherein the indication of the rule comprises a configuration of one of: a control resource set (CORESET); or a search space set.

One set of embodiments may include a method, by a user equipment (UE). The method may include establishing communication with a cellular network via a plurality of transmission and reception points (TRPs); receiving, from the cellular network, an indication of a plurality of transmission control indication (TCI) states activated for downlink communication from the plurality of TRPs; receiving, from the cellular network, a media access control (MAC) control element (MAC-CE) comprising an index of a first TCI state of the plurality of TCI states; selecting, based on the index, the first TCI state for monitoring of control channel messages from the plurality of TRPs; monitoring a control channel for control channel messages according to the first TCI state; receiving, from at least one TRP of the plurality of TRPs and using the first TCI state, a first control channel message; and exchanging data with the cellular network according to the first control channel message.

In some embodiments, the MAC-CE has a fixed size and is identified by a MAC subheader with a dedicated Logical Channel identifier (LCID).

In some embodiments, said exchanging data with the cellular network according to the first control channel message comprises receiving data using at least two TCI states of the plurality of TCI states.

In some embodiments, the MAC-CE is specific to a first control resource set (CORESET).

In some embodiments, wherein the MAC-CE is specific to a first search space set (SSS).

In some embodiments, the MAC-CE is common to a plurality of control resource sets (CORESETs) and includes a bitmap indicating for which of the plurality of CORESETs the index of the first TCI state is applied.

In some embodiments, the MAC-CE is common to a plurality of search space sets (SSSs) and includes a bitmap indicating for which of the plurality of SSSs the index of the first TCI state is applied.

In some embodiments, the MAC-CE comprises an identifier of a serving cell for which the index of the first TCI state applies.

In some embodiments, the control channel comprises a physical downlink control channel (PDCCH).

In some embodiments, the first control channel message comprises a downlink control information (DCI) message.

In some embodiments, the plurality of TCI states comprises exactly two TCI states and the index is indicated in a 1-bit unified TCI index field of the MAC-CE.

In some embodiments, the plurality of TCI states comprises more than two TCI states and the index is indicated in a unified TCI index field comprising more than one bit of the MAC-CE.

One set of embodiments may include a method, by a user equipment (UE). The method may include establishing communication with a cellular network via a plurality of transmission and reception points (TRPs); receiving, from the cellular network, an indication of a plurality of transmission control indication (TCI) states activated for downlink communication from the plurality of TRPs; receiving, from the cellular network, a first downlink control information (DCI) message comprising an indication of a first TCI state of the plurality of TCI states; selecting, based on the indication, the first TCI state for monitoring for further DCI; monitoring for further DCI using the first TCI state; receiving, during said monitoring, a second DCI message; receiving, from at least one TRP of the plurality of TRPs and using the first TCI state, the second DCI message; and exchanging data with the cellular network according to the second DCI message.

In some embodiments, the first DCI message comprises an indication of one or more control resource set (CORESET) to which the first TCI state is to be applied.

In some embodiments, the first DCI message comprises a DCI format 1_1 or 1_2 that does not schedule data and the indication of the one or more CORESET is included in place of a reserved field relative to 3GPP release 17.

In some embodiments, the first DCI message comprises a DCI format 1_1 or 1_2 that does schedule data and the indication of the one or more CORESET is included as an additional field relative to 3GPP release 17.

In some embodiments, the first DCI message comprises an indication of one or more search space set (SSS) to which the first TCI state is to be applied.

In some embodiments, the first DCI message comprises a DCI format 1_1 or 1_2 that does not schedule data and the indication of the one or more SSS is included in place of a reserved field relative to 3GPP release 17.

In some embodiments, the first DCI message comprises a DCI format 1_1 or 1_2 that does schedule data and the indication of the one or more SSS is included as an additional field relative to 3GPP release 17.

In some embodiments, further comprising: receiving, from the cellular network, a message indicating a division of a plurality of control resource sets (CORESETs) or a plurality of search space sets (SSSs) into a first pool and a second pool.

In some embodiments, the first DCI message indicates that the first TCI state is associated with the first pool.

In some embodiments, said selecting the first TCI state is further based on determining that a CORESET or SSS of the first pool is active.

In some embodiments, the first DCI message further comprises an indication of a second TCI state of the plurality of TCI states and further indicates that the second TCI state is associated with the second pool.

In some embodiments, further comprising selecting the second TCI state for reception of a third DCI message associated with a CORESET or SSS of the second pool.

In some embodiments, the first DCI message indicates that the first TC state is associated with the first pool via a 1 bit indication to apply a TCI state with a lowest TCI index value of the plurality of TCI states.

In some embodiments, the first DCI message indicates that the first TCI state is associated with the first pool via a 1 bit indication to apply a TCI state with a highest TCI index value of the plurality of TCI states.

According to one set of embodiments, a method, at a cellular network may comprise: establishing communication with a user equipment (UE) via a plurality of transmission and reception points (TRPs); transmitting, to the UE, an indication of a plurality of transmission control indication (TCI) states for downlink communication from the plurality of TRPs; selecting, according to a first rule, a TCI state of the plurality of TCI states for control channel messages from the cellular network to the UE via the plurality of TRPs; transmitting, to the UE via at least one TRP of the plurality of TRPs, a first control channel message using the selected TCI state; and exchanging data, with the UE, according to the first control channel message.

In some embodiments, wherein the first rule is specified by a 3GPP wireless standard.

In some embodiments, further comprising: transmitting, to the UE, an indication of the first rule.

In some embodiments, the first control channel message comprises a downlink control information (DCI) message transmitted on a physical downlink control channel (PDCCH).

In some embodiments, further comprising: at a later time, determining that the UE has moved, and in response to the determination that the UE has moved: transmitting, to the UE, an indication of a second plurality of TCI states for downlink communication from the plurality of TRPs; selecting, according to the first rule, a second TCI state of the second plurality of TCI states for control channel messages from the cellular network to the UE via the plurality of TRPs; transmitting, to the UE via at least one TRP of the plurality of TRPs, a second control channel message using the second TCI state; and exchanging data, with the UE, according to the second control channel message.

According to one set of embodiments, a method, at a cellular network may comprise: establishing communication with a user equipment (UE) via a plurality of transmission and reception points (TRPs); transmitting, to the UE, an indication of a plurality of transmission control indication (TCI) states activated for downlink communication via the plurality of TRPs; selecting, a first TCI state of the plurality of TC states for transmission of control channel messages to the UE: transmitting, to the UE, a media access control (MAC) control element (MAC-CE) comprising an index of the first TC state; transmitting, to the UE and using the first TCI state, a first control channel message: and exchanging data with the UE according to the first control channel message.

In some embodiments, the MAC-CE has a fixed size and is identified by a MAC subheader with a dedicated Logical Channel identifier (LCID).

In some embodiments, said exchanging data with the UE according to the first control channel message comprises: transmitting data using at least two TCI states of the plurality of TCI states.

In some embodiments, the MAC-CE is specific to a first control resource set (CORESET).

In some embodiments, the MAC-CE is specific to a first search space set (SSS).

In some embodiments, the MAC-CE is common to a plurality of control resource sets (CORESETs) and includes a bitmap indicating for which of the plurality of CORESETs the index of the first TCI state is applied.

In some embodiments, the MAC-CE is common to a plurality of search space sets (SSSs) and includes a bitmap indicating for which of the plurality of SSSs the index of the first TCI state is applied.

In some embodiments, the MAC-CE comprises an identifier of a serving cell for which the index of the first TCI state applies.

According to one set of embodiments, a method, at a cellular network may comprise: establishing communication with a user equipment (UE) via a plurality of transmission and reception points (TRPs); transmitting, to the UE, an indication of a plurality of transmission control indication (TCI) states activated for downlink communication from the plurality of TRPs; selecting a first TCI state of the plurality of TCI states for transmission of a second downlink control information (DCI) message to the UE; transmitting, to the UE, a first DCI message comprising an indication of the first TC state; transmitting, to the UE using the first TCI state, the second DCI message; and exchanging data with the UE according to the second DCI message.

In some embodiments, the first DCI message comprises an indication of: one or more control resource set (CORESET) or to which the first TCI state is to be applied; or one or more search space set (SSS) to which the first TCI state is to be applied.

In some embodiments, the first DCI message comprises a DCI format 1_1 or 1_2.

In some embodiments, further comprising: transmitting, to the UE, a message indicating a division of a plurality of control resource sets (CORESETs) or a plurality of search space sets (SSSs) into a first pool and a second pool.

In any of the above embodiments, the control channel may be a PDCCH, among various possibilities.

In any of the above embodiments, a control channel message may be a downlink control information (DCI) message. The DCI message(s) may be of any DCI format(s).

In any of the above embodiments, a TCI state may be a unified TCI state.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
by a user equipment (UE):
establishing communication with a cellular network via a plurality of transmission and reception points (TRPs);
receiving, from the cellular network, an indication of a plurality of unified transmission control indication (TCI) states activated for downlink communication from the plurality of TRPs;
receiving, from the cellular network, a message indicating a division of a plurality of control resource sets (CORESETs) or a plurality of search space sets (SSSs) into a first pool and a second pool;
receiving, from the cellular network, a first downlink control information (DCI) message comprising an indication of a first TCI state of the plurality of unified TCI states, wherein the first DCI message indicates that the first TCI state is associated with the first pool;
selecting, based on the indication, the first TCI state for monitoring for further DCI after the first DCI message, wherein said selecting the first TCI state is further based on determining that a CORESET or SSS of the first pool is active;
monitoring for further DCI using the first TCI state;
receiving, during the monitoring, a second DCI message;
receiving, from at least one TRP of the plurality of TRPs and using the first TCI state, the second DCI message; and
exchanging data with the cellular network according to the second DCI message.

2. The method of claim 1, wherein the first DCI message comprises an indication of one or more control resource set (CORESET) to which the first TCI state is to be applied.

3. The method of claim 2, wherein the first DCI message comprises a DCI format 1_1 or 1_2 that does not schedule data and the indication of the one or more CORESET is included in place of a reserved field relative to 3GPP release 17.

4. The method of claim 2, wherein the first DCI message comprises a DCI format 1_1 or 1_2 that does schedule data and the indication of the one or more CORESET is included as an additional field relative to 3GPP release 17.

5. The method of claim 1, wherein the first DCI message comprises an indication of one or more search space set (SSS) to which the first TCI state is to be applied.

6. The method of claim 5, wherein the first DCI message comprises a DCI format 1_1 or 1_2 that does not schedule data and the indication of the one or more SSS is included in place of a reserved field relative to 3GPP release 17.

7. The method of claim 5, wherein the first DCI message comprises a DCI format 1_1 or 1_2 that does schedule data and the indication of the one or more SSS is included as an additional field relative to 3GPP release 17.

8. The method of claim 1, wherein the first DCI message further comprises an indication of a second TCI state of the plurality of unified TCI states and further indicates that the second TCI state is associated with the second pool.

9. The method of claim 8, further comprising selecting the second TCI state for reception of a third DCI message associated with a CORESET or SSS of the second pool.

10. The method of claim 1, wherein the first DCI message indicates that the first TCI state is associated with the first pool via a 1-bit indication to apply a TCI state with a lowest TCI index value of the plurality of TCI states.

11. The method of claim 1, wherein the first DCI message indicates that the first TCI state is associated with the first pool via a 1-bit indication to apply a TCI state with a highest TCI index value of the plurality of TCI states.

12. An apparatus, comprising:
a processor configured to cause a user equipment (UE) to:
establish communication with a cellular network via a plurality of transmission and reception points (TRPs);
receive, from the cellular network, an indication of a plurality of unified transmission control indication (TCI) states activated for downlink communication from the plurality of TRPs;
receive, from the cellular network, a message indicating a division of a plurality of control resource sets (CORESETs) or a plurality of search space sets (SSSs) into a first pool and a second pool;
receive, from the cellular network, a first downlink control information (DCI) message comprising an indication of a first TCI state of the plurality of unified TCI states, wherein the first DCI message indicates that the first TCI state is associated with the first pool;
select, based on the indication, the first TCI state for monitoring for further DCI after the first DCI message, wherein said selecting the first TCI state is further based on determining that a CORESET or SSS of the first pool is active;
monitor for further DCI using the first TCI state;
receive, during the monitoring, a second DCI message;
receive, from at least one TRP of the plurality of TRPs and using the first TCI state, the second DCI message; and
exchange data with the cellular network according to the second DCI message.

13. The apparatus of claim 12, further comprising a radio operably coupled to the processor.

14. A method, comprising:
at a cellular network:
establishing communication with a user equipment (UE) via a plurality of transmission and reception points (TRPs);
transmitting, to the UE, a indication of a plurality of unified transmission control indication (TCI) states activated for downlink communication from the plurality of TRPs;
transmitting, to the UE, a message indicating a division of a plurality of control resource sets (CORESETs) or a plurality of search space sets (SSSs) into a first pool and a second pool;
selecting a first TCI state of the plurality of unified TCI states for transmission of a second downlink control information (DCI) message to the UE, wherein said selecting the first TCI state is further based on determining that a CORESET or SSS of the first pool is active;

transmitting, to the UE, a first DCI message comprising an indication of the first TCI state, wherein the first DCI message indicates that the first TCI state is associated with the first pool;

transmitting, to the UE using the first TCI state, the second DCI message; and exchanging data with the UE according to the second DCI message.

15. The method of claim 14, wherein the first DCI message comprises an indication of:

one or more CORESET to which the first TCI state is to be applied; or one or more SSS to which the first TCI state is to be applied.

16. The method of claim 15, wherein the first DCI message comprises a DCI format 1_1 or 1_2.

* * * * *